Oct. 14, 1958     L. L. SMITH ET AL     2,855,841
LOUVER TYPE VENTILATOR
Filed May 17, 1954                                                  7 Sheets-Sheet 1
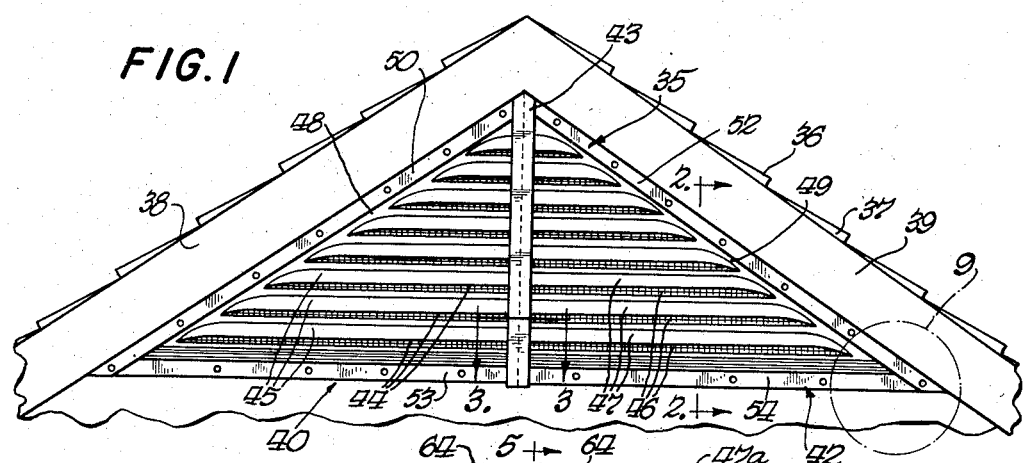
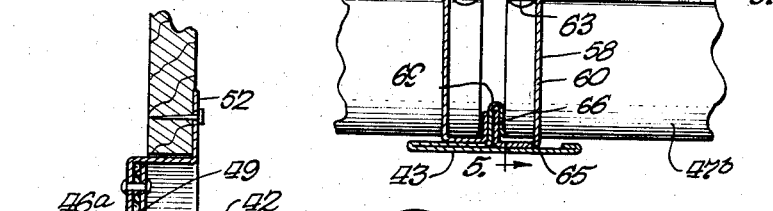
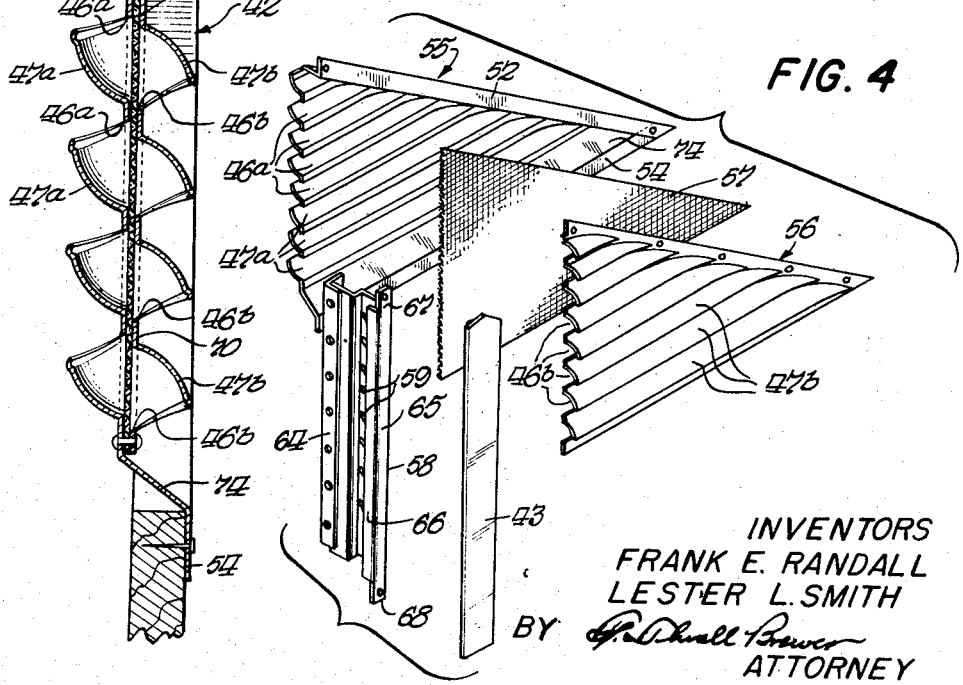
INVENTORS
FRANK E. RANDALL
LESTER L. SMITH
BY
ATTORNEY

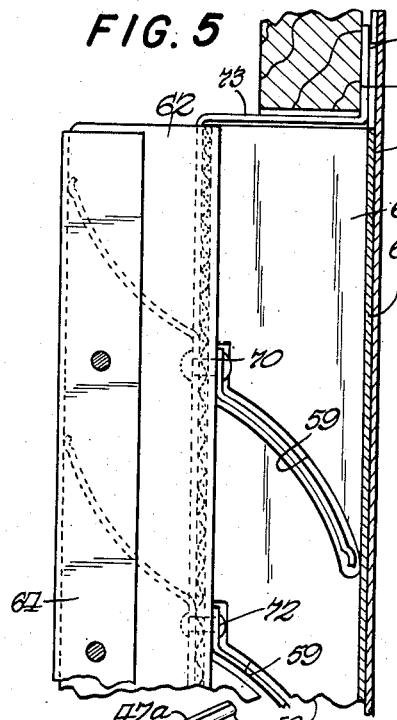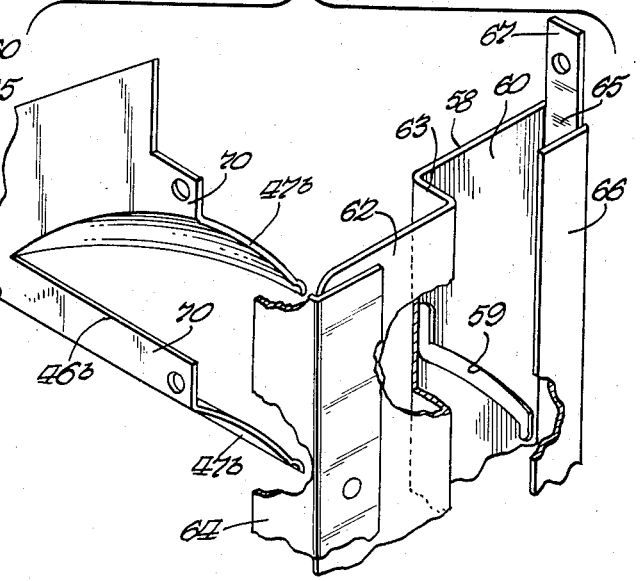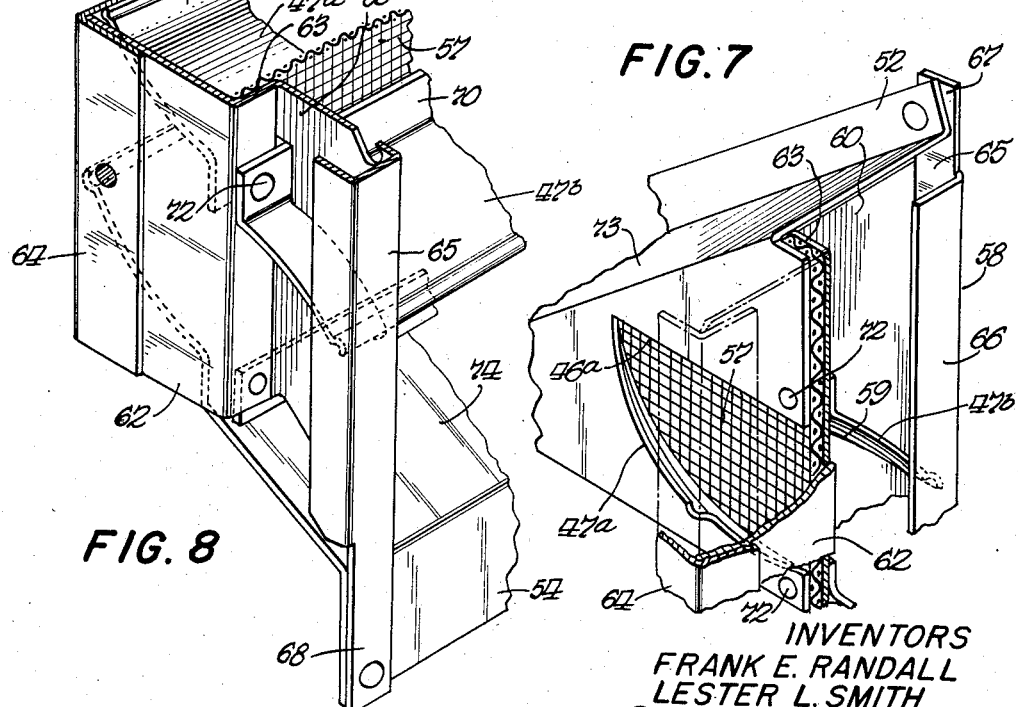

Oct. 14, 1958   L. L. SMITH ET AL   2,855,841
LOUVER TYPE VENTILATOR
Filed May 17, 1954
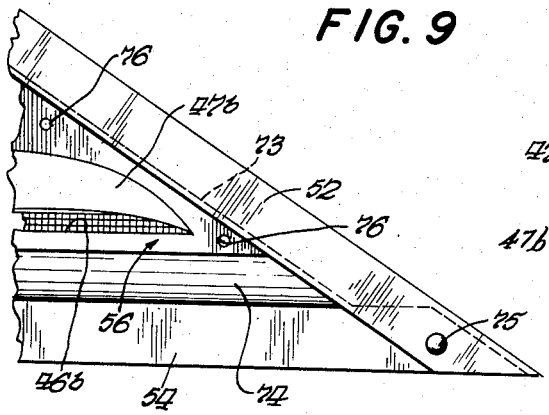
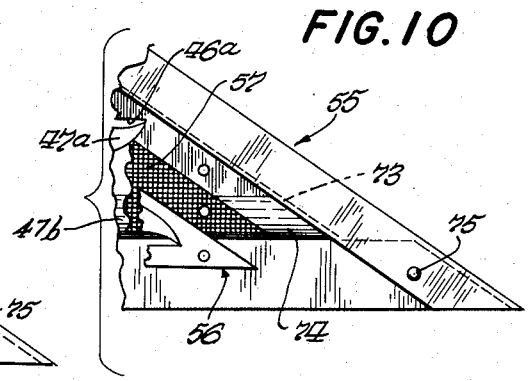
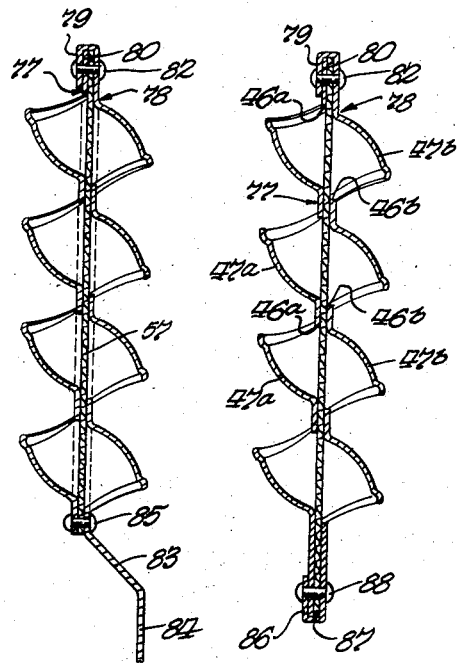
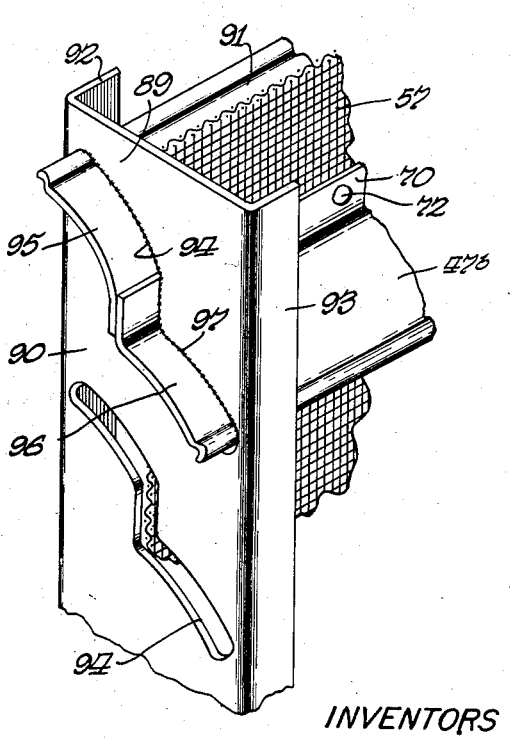
INVENTORS
FRANK E. RANDALL
LESTER L. SMITH
BY
ATTORNEY

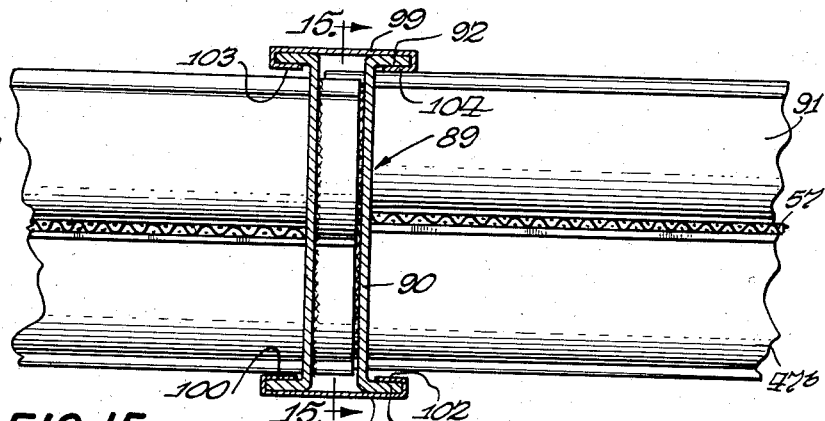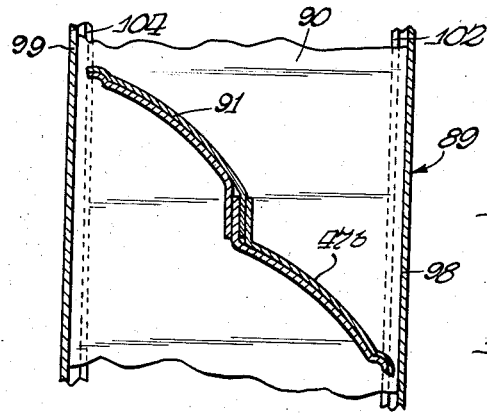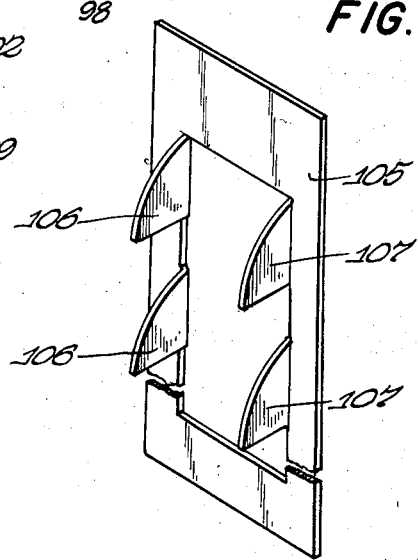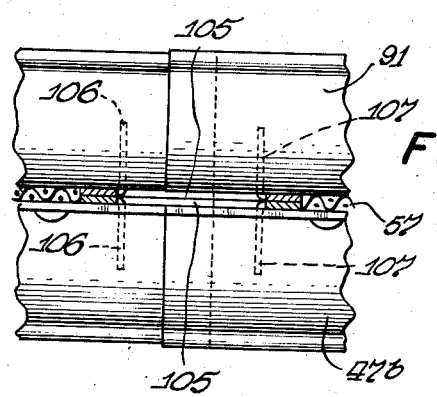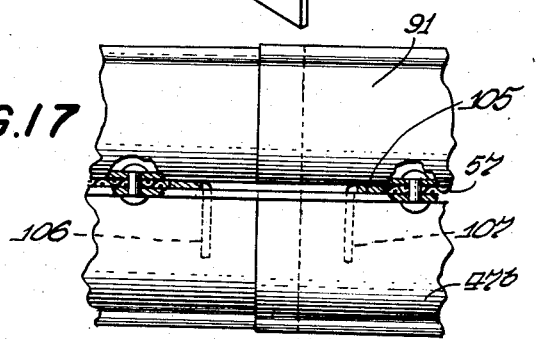

Oct. 14, 1958 L. L. SMITH ET AL 2,855,841
LOUVER TYPE VENTILATOR
Filed May 17, 1954 7 Sheets-Sheet 5
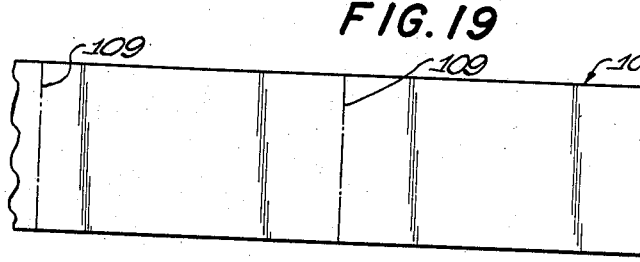
FIG. 19
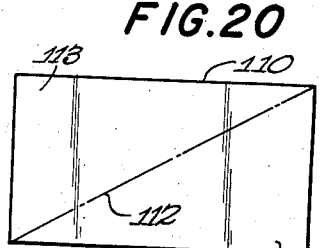
FIG. 20
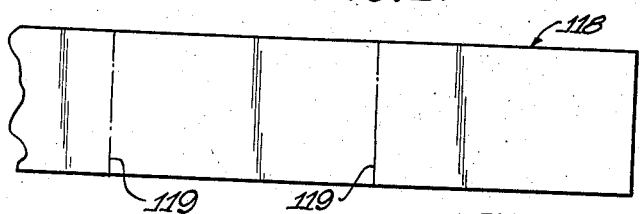
FIG. 21
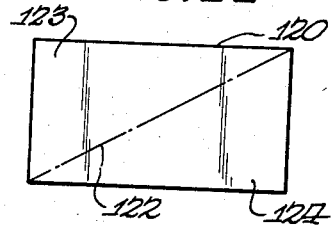
FIG. 22
FIG. 23
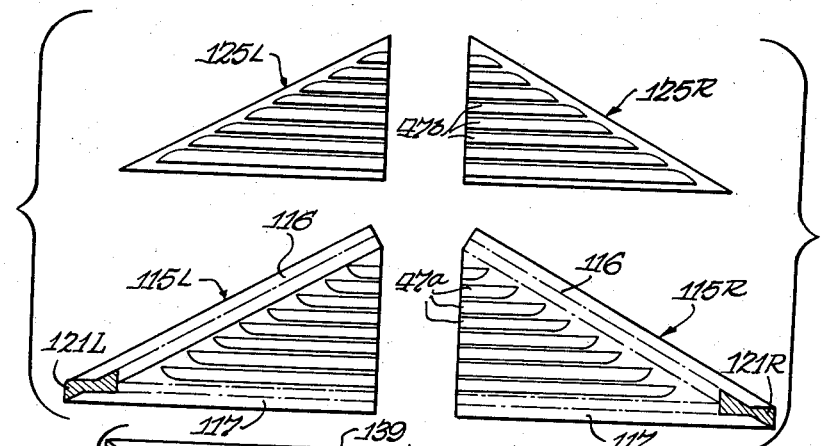
FIG. 25
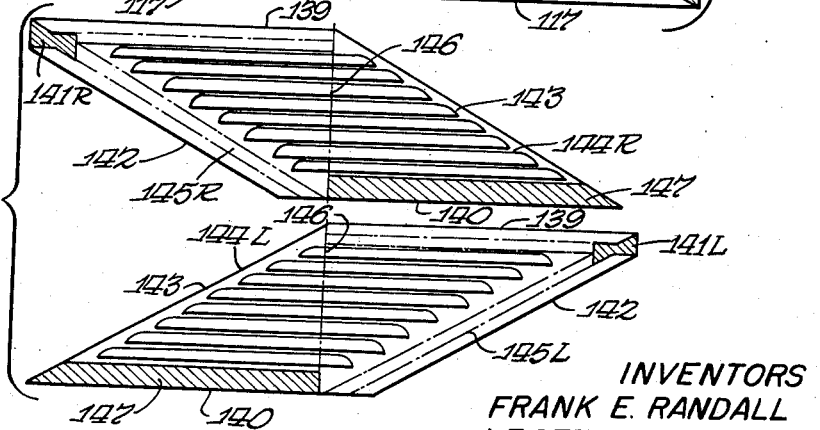
INVENTORS
FRANK E. RANDALL
LESTER L. SMITH
BY
ATTORNEY

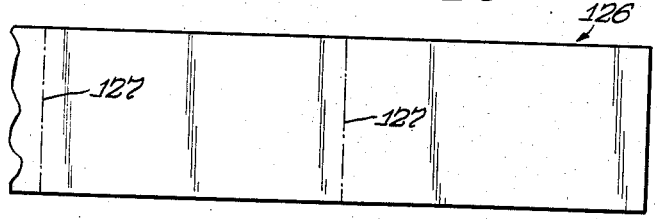
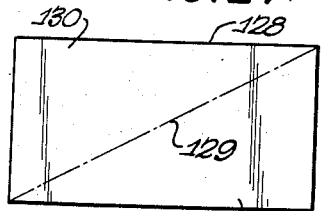
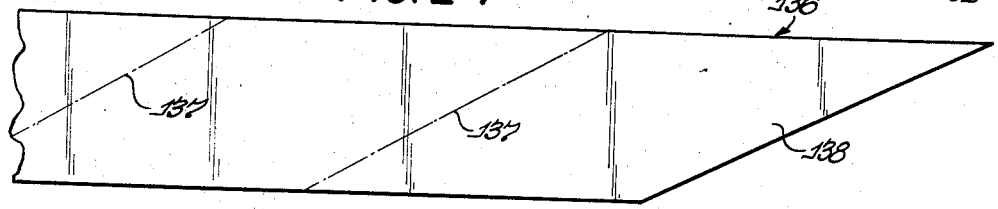
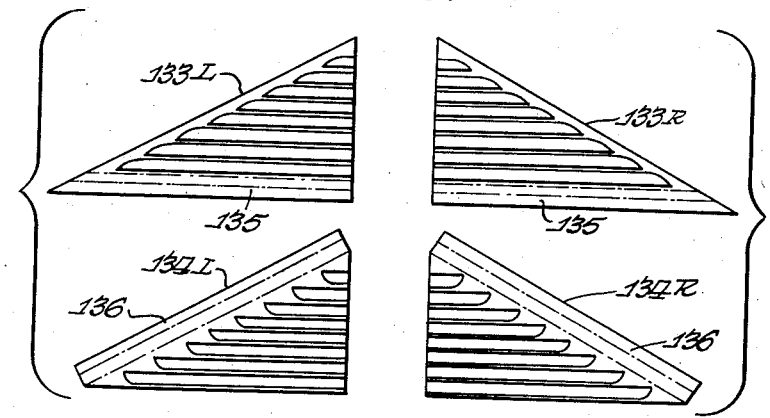
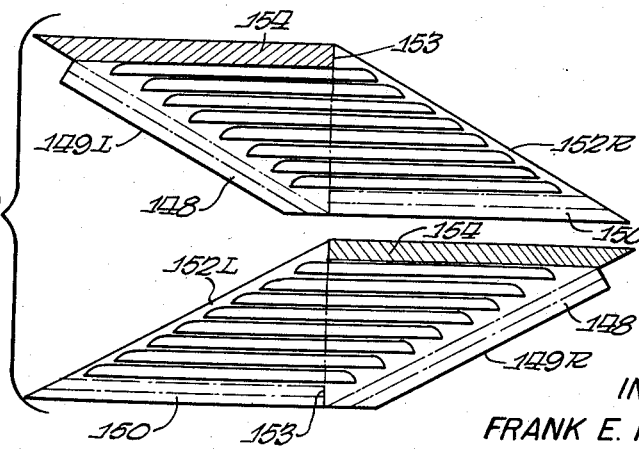

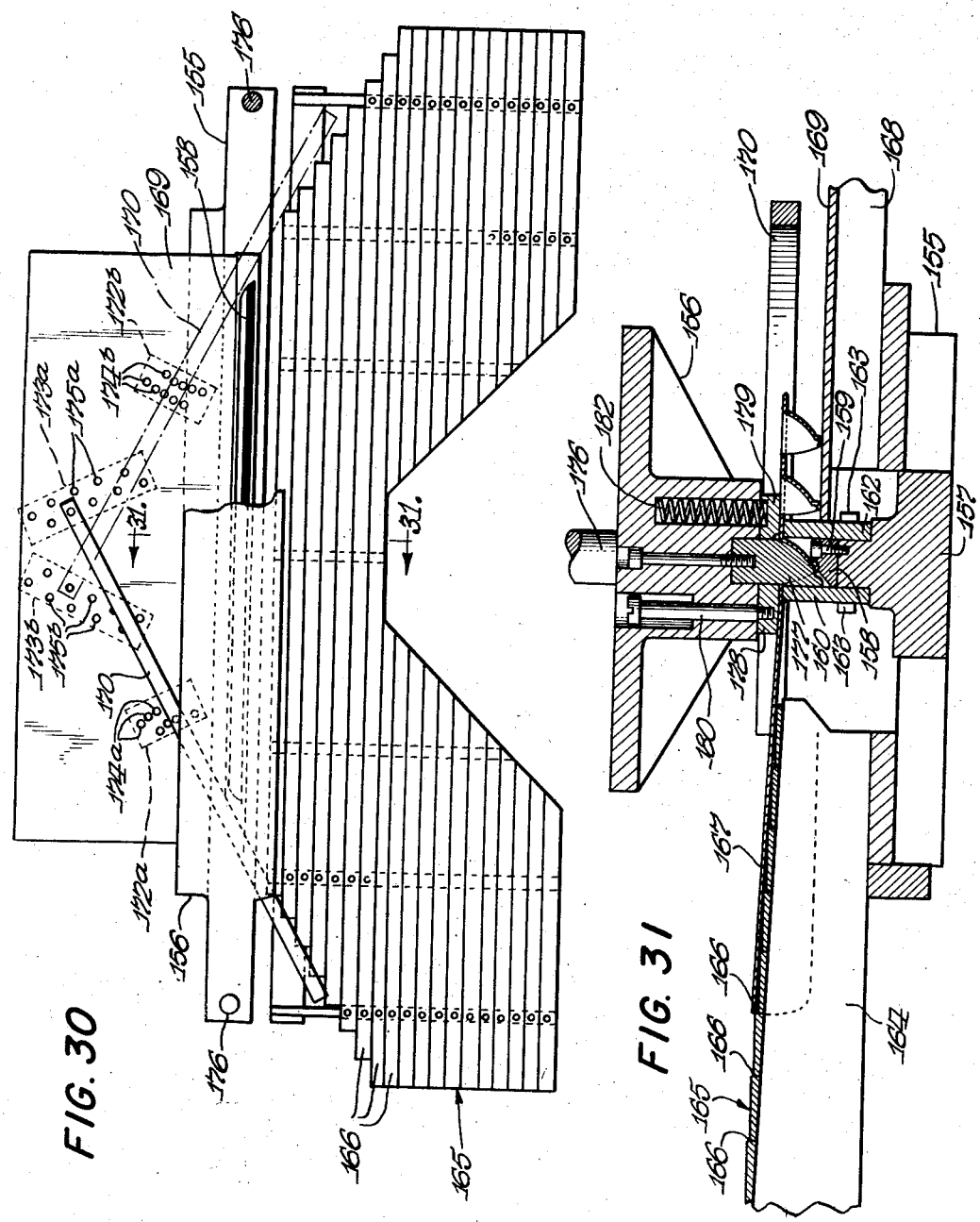

United States Patent Office 2,855,841
Patented Oct. 14, 1958

2,855,841

LOUVER TYPE VENTILATOR

Lester L. Smith, Peoria, and Frank E. Randall, Peoria Heights, Ill.; said Randall assignor to said Smith Application May 17, 1954, Serial No. 430,272

1 Claim. (Cl. 98—121)

This invention relates to louver type ventilators and more particularly the invention relates to the structure of louver type ventilators wherein the louvers are formed in sheet material.

Subject matter disclosed, but not claimed herein has been presented in our copending application, Serial No. 501,047, filed April 13, 1955, for Method of Making Louver Type Ventilators.

One of the objects of our invention is to provide sectional louver type ventilators in which stamped louver panels are utilized.

As another object, our invention comprehends the provision of louver type ventilators of various sizes and with different numbers of louvers, and which permit the use of the same stamping die for producing the different sizes and numbers of louvers.

Our invention further contemplates the provision of triangular louver type ventilators having various pitch angles, whereby the same stamping die can be used for each of the various pitch angles.

It is another object of our invention to provide double panel triangular or sectional louver type ventilators with louvers projecting from both panels and wherein a screen is mounted between the panels to cover the louver openings.

Another object of this invention is to provide louver type ventilators which not only contribute to low tool and labor costs in production, but which are also very economical of material and the kinds and sizes of material required for producing the parts.

Other objects and advantages of the invention will be apparent from the following description and the accompanying drawings in which similar characters of reference indicate similar parts throughout the several views.

Referring to the seven sheets of drawings:

Fig. 1 is a front elevational view showing the application of a louver type ventilator incorporating a preferred embodiment of this invention as it is applied to the gable of a building, such as a house;

Fig. 2 is an end sectional view drawn to a larger scale than Fig. 1 and taken substantially on a line 2—2 of Fig. 1 and in the direction indicated by arrows;

Fig. 3 is a fragmentary top sectional view drawn to a larger scale than Fig. 1 and wherein the section is taken substantially on a line 3—3 of Fig. 1 and viewed as indicated by arrows;

Fig. 4 is an exploded view in perspective showing the principal parts of one section of the louver type ventilator illustrated in Fig. 1;

Fig. 5 is a fragmentary end sectional view wherein the section is taken substantially on a line 5—5 of Fig. 3 and in the direction indicated by arrows;

Fig. 6 is a fragmentary exploded view of a portion of our preferred louver type ventilator structure of the form shown in Figs. 1 to 5 inclusive, and wherein the portions of the parts illustrated are shown in perspective;

Fig. 7 is a fragmentary perspective view with parts broken away and shown in phantom by dot-and-dash lines, and wherein the view is taken from the rear and at the top of one end of a louver type ventilator section incorporating a preferred form of our invention;

Fig. 8 is a fragmentary perspective view of a lower end portion of the assembly of one section of the louver type ventilator thus far illustrated and is taken from in front and toward one end of the ventilator section;

Fig. 9 is a fragmentary front elevational view of a lower corner portion of the louver type ventilator depicted in Fig. 1, drawn to a larger scale than Fig. 1 and showing substantially the portion of the structure indicated in Fig. 1;

Fig. 10 is a fragmentary exploded view which is similar to Fig. 9, but which indicates the separation of parts of the structure which are depicted in their assembled relationship in Fig. 9;

Fig. 11 is an end sectional view similar to Fig. 2, but depicting a modification of the structure illustrated in Fig. 2;

Fig. 12 is an end sectional view similar to Fig. 11, but depicting a second modification of the ventilator structure;

Fig. 13 is a fragmentary view in perspective which shows a modification of a portion of the structure other than that illustrated in Figs. 11 and 12;

Fig. 14 is a fragmentary top sectional view illustrating the assembled relationship of two louver type ventilator sections of the type shown in Fig. 13;

Fig. 15 is a fragmentary end sectional view taken substantially on a line 15—15 of Fig. 14 and in the direction indicated by arrows;

Fig. 16 is a perspective view of a modification of a part of our disclosed louver type ventilator structure;

Fig. 17 is a fragmentary type sectional view similar to Fig. 3 and illustrating an assembly of louver type ventilator sections utilizing the part depicted in Fig. 16;

Fig. 18 is a fragmentary top sectional view similar to Fig. 17, but showing an assembly of louver type ventilator sections incorporating two of the parts illustrated in Fig. 16 mounted in back-to-back and inverted relationship to one another;

Fig. 19 is a fragmentary plan view illustrating one step in a preferred manner of cutting sheet metal from strip or roll stock for producing blanks for one of the panel parts adapted to use in one method of fabricating louver type ventilators in accordance with our present invention;

Fig. 20 is a top plan view illustrating a second step in cutting the stock for preparing the blanks utilized for the production of the said one panel part;

Fig. 21 is a fragmentary plan view illustrating one step of cutting blanks from strip or roll stock for use in fabricating a second type of blank utilized in producing the disclosed louver structure;

Fig. 22 is a top plan view indicating a second cut utilized in preparing the blanks for the said second panel part;

Fig. 23 depicts fabricated panel parts made from the blanks produced as indicated in Figs. 20 and 22;

Fig. 24 is a fragmentary plan view illustrating another manner of cutting sheet metal blanks from strip or roll stock for the production of ventilator section panels by a modified method and for use in the production of ventilator sections in accordance with our invention;

Fig. 25 depicts one manner of cutting partially fabricated ventilator panels which are produced from stock cut in the manner illustrated in Fig. 24;

Figs. 26 and 27 are views similar to those of Figs. 19 and 20, but which illustrate the manner of cutting blanks from sheet or strip stock, so that all of the panel sections are made from blanks of the same width;

Fig. 28 illustrates partially fabricated panels made from blanks of the type illustrated in Fig. 27, which partially fabricated panels vary somewhat in structure from those illustrated in Fig. 23;

Fig. 29 illustrates the manner of cutting partially fabricated panels from pieces produced from blanks of the type shown in Fig. 24, which partially fabricated panels, although differently produced, are comparable in structure to those depicted in Fig. 28;

Fig. 30 is a somewhat diagrammatic top plan view of a piercing and forming die and associated parts utilized for producing louver panels of the type disclosed herein by successively piercing and forming those panels with a single die, the structure illustrated being adapted to variations for changing the pitch angle of ventilator sections produced thereby; and Fig. 31 is a fragmentary end sectional view taken substantially on a line 31—31 of Fig. 30 and indicating the manner of piercing and forming prepared blanks in successive steps with the same die to produce sectional ventilators of the type herein disclosed by our preferred method.

Considered generally, the louver type ventilators herein disclosed are fabricated mainly from sheet metal parts, and are made in sections adapted to ready assembly at the time of their application to a building structure, thereby to afford ventilators of large area without introducing problems into the fabrication, shipping and installation as a result of the unwieldy size of a comparable unitary structure. In addition, and as will become apparent, the fabrication of the ventilators in section from sheet stock not only limits the required number of parts to a very small minimum, but also affords advantages resulting from an ability to produce ventilators of varying sizes and shapes with a very nominal tool cost and without the necessity of having different dies for each size and shape.

Having reference to the preferred embodiment of our louver structure which is illustrated in detail in Figs. 1 to 10 inclusive of the drawings, and wherein that structure affords an illustrative embodiment of our invention, a louver type ventilator 35 is shown assembled in Fig. 1 and applied to the gable at one end of a building, such as a house 36 having a roof 37 and trim strips 38 and 39 which overlap marginal portions of the ventilator. This louver type ventilator 35 embodies left- and right-hand sections 40 and 42 respectively, as viewed, which sections are separately fabricated and shipped to the point of application to the building structure. The line of division between the assembled sections 40 and 42 is, in the finished and assembled ventilator structure, covered by a trim strip 43.

The ventilator section 40 is in the form of a panel of right-triangular shape having therein a series of elongated slots 44 for the passage of air through the ventilator, which slots are substantially parallel to one another and to the base of the panel, as well as overlapped by louvers 45, the louvers of the disclosed structure being integrally made from the panel stock by a piercing and forming operation. Likewise, the panel 42 has therein a series of substantially parallel slots 46 which are spaced for alignment with the slots 44 in the section 40 when the ventilator sections 40 and 42 are abutted together in opposed relationship, as shown. Each of the slots 46 in the ventilator section 42 is overlapped by an integrally formed louver 47. Side margins 48 and 49 are provided on each of the ventilator sections 40 and 42 by spacing the ends of the slots and their respective louvers inwardly by substantially equal amounts from the adjacent edges of the panels. In the structure illustrated in Figs. 1 to 10 inclusive, side flanges 50 and 52 and bottom flanges 53 and 54 are provided on the ventilator sections 40 and 42 respectively and the mid portion of each ventilator section is set back from those flanges to provide for substantially flush mounting of the ventilator structure with the general outer plane of the building wall to which it is secured.

Although laterally reversed, the structure of each of the ventilator sections 40 and 42 is substantially the same, so that a description of the structural details of one section will suffice for both. In our disclosed ventilator structure, and as depicted in Figs. 2 and 4, each ventilator section, such as 42, incorporates inner and outer panel parts 55 and 56, each of right-triangular shape and made so that the elongated slots 46a in the inner panel part register with the slots 46b in the outer panel part when the two panels are assembled and secured together in face-to-face relationship for use. The louvers 47b on the outer panel part, however, extend downwardly over the slots, while the louvers 47a on the inner panel part extend upwardly over the adjacent slots. This arrangement, as shown in Fig. 2, affords double weather protection for keeping out driving rain, snow and the like without materially restricting the areas of the ventilating openings. Also, in our disclosed structure, a screen 57 is interposed between the inner and outer panel parts for protection from the free passage of insects and the like. As may be observed by reference to Fig. 4, the inner and outer panel parts each constitute an integrally fabricated structure which, although the slots extend to one end and open outwardly at that end, is held together by the marginal portion at the opposite ends of the slots. In order to afford rigidity to each ventilator section and to provide support for the free ends of the louvers in the assembled ventilator sections, we provide a supporting strip 58 having slots 59 therein through which the ends of the louvers of at least the outer panel parts extend. The detail of this portion of the disclosed structure is illustrated in Figs. 5, 6, 7 and 8. It may be observed that the supporting strip 58, in the form shown, has parallel portions 60 and 62 integrally connected through a web 63 and offset from one another in a direction lateral to the planes of those portions. The portion 60, in the assembly of the louver section, is aligned with the louvers 47b of the outer panel and has the slots 59 therein through which the ends of those louvers extend, the slots 59 being shaped to conform to the end contours of the louvers, so that they fit therein. The ends of the louvers 47a of the inner panel, of each ventilator section, are in closely spaced relationship to the portion 62 of the supporting strip and are supported relative thereto along the rear surfaces of the end margins of those louvers by an angle strip 64 secured by fastening means, such as rivets 61 to the rear margin of the portion 62 and extending along the length of that portion with one flange of the angle projecting behind the louvers 47a in the assembly of the ventilator section. At the front of the supporting strip 58, it has integral flange portions 65 and 66 formed thereon to provide a substantially U-shaped front sectional portion along the portion 60 of the supporting strip. The flange 65 has projecting ends 67 and 68 to which marginal portions of the outer louver panel are secured and carries the flange 66 along one side which, as shown in Fig. 3, serves as an anchor for carrying the trim strip 43 which has a hook-shaped portion 69 on its rear surface for engaging the flange 66.

Each of the louvers 47a and 47b has a relatively flat strip portion 70 along its inner margin which is secured by fastening means such as a rivet 72 to the web 63 of the supporting strip. In the structure shown in Figs. 1 to 10 inclusive, the relatively flat strip portions 70 on the louvers of the inner and outer panels are aligned and disposed on opposite sides of the web 63, so that the rivets or fastening means 72 serve to anchor the ends of both sets of louvers to the supporting strip. In order to provide for the aforementioned flush mounting of the assembled louver sections relative to a wall or supporting structure, a flange 73 extends forwardly from the inner louver panel and adjoins the marginal flange 52, this flange 73 extending along practically the full length of the outer edge of the louver panel. At the bottom of the inner louver panel, a skirt 74 extends outwardly from the inner louver panel and adjoins the flange 54, this skirt being disposed at an obtuse angle with respect to the general plane of the louver panel and the plane of the flange 54, in order to provide for drainage. While the flanges and skirt of the presently considered structure are both on the inner louver panel, it is understood that they might both be on the outer louver panel or one might be on one louver panel and one on the other.

As depicted in Figs. 9 and 10, the flange 73 has its outer end cut to engage and form a joint with the skirt 74, while the flange 52 extends beyond the end of the flange 73 and overlaps the end of the bottom flange 54, the outer ends of the flanges 52 and 54 being secured together by fastening means, such as a rivet 75. As also shown in Figs. 9 and 10, the outer louver panel mounts against the outer surface of the inner louver panel between the flange 73 and the skirt 74, and is secured in place along the outer margin thereof by fastening means such as rivets 76, the screen 57 being interposed between the louver panels when such screen is used in the assembled ventilator structure.

In mounting two of the louver sections of the type thus far described to provide a composite ventilator structure of the type illustrated in Fig. 1, adjacent ends of the two opposed sections are abutted together, as shown in Fig. 3. The angle strips at the rear of the supporting strip 58 engage one another, and the flanges 66 at the front of the supporting strip are separated only by the hook portion 69 of the trim strip 43, which hook portion is gripped therebetween to secure the trim strip in place. It may be observed by reference to Fig. 1 that the slots and louvers of the two ventilator sections are aligned to give the appearance of continuity across the structure, and that the trim strip 43 covers the joint between the ventilator sections to afford a finished appearance to the assembled sections.

In the several modifications of various details of the structures of the ventilator sections which are illustrated in Figs. 11 to 17 inclusive, the same general triangular types of ventilator sections are contemplated and reference characters similar to those previously used refer to like parts which perform corresponding functions. However, variations of the structure are illustrated which are considered to be feasible without departing from the spirit and more basic features of the invention herein disclosed.

In the modification illustrated in Fig. 11, an inner panel part 77 is of generally right-triangular shape and the flanges 73 and 52, as well as the skirt 74 and flange 54, as utilized in the embodiment of the invention illustrated in Figs. 1 to 10 inclusive, have been eliminated from that inner panel part. Furthermore, an outer panel part 78 has a marginal portion 79 thereon which folds around an outer side margin 80 of the inner panel part, as well as a margin of the screen 57. The folded marginal portion of the outer panel part 78 and the marginal portion 80 of the inner panel part, as well as the margin of the screen 57, are securely fastened together by fastening means such as rivets 82 which extend therethrough. At the bottom of the ventilator section, a skirt 83 is made integral with the outer panel part and extends outwardly from the general plane of that outer panel part to a flange 84, which latter flange is adapted to be secured to a sill or the like. Adjacent lower marginal portions of the inner and outer panel parts are secured together by fastening means such as rivets 85.

In the modification illustrated in Fig. 12, the structure of the ventilator section is like that shown in Fig. 11, except that the skirt 83 and flange 84 utilized in the structure of Fig. 11 are eliminated, and a marginal portion 86 along the bottom of the outer panel part 78 is folded around a lower marginal portion 87 of the inner panel part, and those parts are secured in their assembled relationship by fastening means, such as rivets 88.

In the modified structure shown in Fig. 13, a supporting strip 89 is used which differs from the supporting strip 58 of the form shown in Figs. 1 to 10 inclusive. The supporting strip 89 is generally channel shaped with a web 90 extending between side flanges 92 and 93. The web 90 is generally flat and has slots 94 therein which are shaped to receive the free ends of louvers 91 of the inner louver panel and the louvers 47b of outer panel part. As depicted, end portions 95 and 96 of the louvers 91 and 47b respectively extend through the slots 94. With this structure, the supporting strip may be secured in place relative to the respective louvers by soldering, as indicated at 97, along the lines of contact between the louvers and the supporting strip.

As shown in Figs. 14 and 15, ventilator sections of the type illustrated in Fig. 13 are abutted together with the end portions 95 and 96 of the louvers of adjacent ventilator sections overlapping one another. In this instance, also, an outer trim strip 98 and an inner holding strip 99 are generally C-shaped in section and have flange portions 100, 102, 103 and 104 thereon which extend around the side flanges 92 and 93 of the adjacent supporting strips 89 to secure the louver sections together and cover the joint between those sections.

Fig. 16 illustrates another type of supporting strip 105. This supporting strip has the mid portion thereof punched and formed to provide pairs of contoured louver supporting ears 106 and 107 projecting to one side of the general plane of the supporting strip and aligned laterally of the strip, such projecting ears being provided in spaced relationship longitudinally of the supporting strip to fit into and support the inner surfaces of the ends of louvers of adjacent sections in the manner illustrated in Fig. 17. In this instance, it is preferred that the adjacent ends of the louvers of adjacent sections shall overlap between the pairs of projecting ears 106 and 107, as shown in Fig. 17, to further rigidify and strengthen the assembled sections.

As shown in Fig. 18, two of the supporting strips such as 105 may be placed together in back-to-back relationship with one another and with one strip inverted and offset with respect to the other, so that the opposed projecting ears support the louvers on both the inner and outer panel parts. In this instance, as in the structure depicted in Fig. 17, the adjacent ends of the louvers of adjoined ventilator sections overlap between the pairs of projecting ears on the supporting strips.

Figs. 19 to 29 inclusive are concerned primarily with the method and steps utilized in the fabrication of panel parts for the ventilator sections of the type herein described. Considered generally, Figs. 19 and 23 inclusive illustrate the steps of cutting blanks from strip or roll stock of two different widths to produce right- and left-hand panel parts wherein the mounting flanges and skirt are on the inner panel part, as depicted structurally in Figs. 1 to 10 inclusive. Figs. 24 and 25 illustrate a different manner of cutting and utilizing blanks of strip or roll stock to produce louver panel parts of the same type as those illustrated in Fig. 23. Figs. 26, 27 and 28 show a method of cutting blanks and fabricating right- and left-hand panel parts wherein the mounting flanges and the skirt are divided between the panel parts. Figs. 24 and 29 illustrate a method of producing panel parts of the type shown in Fig. 28 by methods similar to that illustrated in Figs. 24 and 25.

As depicted in Figs. 19, sheet metal stock 108 which may be from a roll or in strip form is cut laterally along lines such as 109 to provide rectangular pieces 110 of a size such that when cut diagonally along a line 112, two blanks 113 and 114 of right-triangular shape are produced therefrom, which blanks are of a size such that by further cutting, piercing and forming operations, partially completed panel parts 115R and 115L are produced from each of the pieces 110. The partially completed panel parts 115R and 115L of the type shown in Fig. 23, when completed, constitute panel parts of the type shown at 55 in Fig. 4. Since the panel parts 115R and 115L include marginal portions 116 and 117 along the base and hypotenuse of the right-triangular panel parts, which marginal portions are bent to provide mounting flanges and flashing, the stock used for those parts is somewhat wider than that used for producing the outer panel parts and waste pieces 121R and 121L of irregular contour are cut from the acute angular corner portions to establish a pattern in the blanks which is suited to the folding of the flanges and flashing. As indicated in Figs. 21 and 22, sheet metal stock 118 which is somewhat narrower than the stock 108 is cut laterally along lines 119 to produce rectangular pieces 120, which latter pieces are cut diagonally along a line 122 to provide blanks 123 and 124 for the production of panel parts 125L and 125R, as shown in Fig. 23.

One of the features of our illustrated method of producing louvered panel parts is that it tends to minimize tool cost by (a) permitting the piercing and forming operations for the integral formation of louver panels to be accomplished in successive steps with a die which pierces and forms the sheet metal blank stock individually and sequentially to produce a series of louvers on each blank, and (b) permitting the guides utilized with the die in the piercing and forming operations to be adjusted so that the panel parts having different numbers of louvers or panel parts adapted to conform to different roof pitch angles can be produced with the same piercing and forming die.

When right-triangular blanks such as 113, 114, 123 and 124 are to have the louvers integrally formed therein for the production of sectional ventilators of the type herein disclosed, guides are utilized with the piercing and forming die which not only effect uniform spacing of a series of louvers in the blank, but which also gauge the longitudinal portion of the piercing and forming die which is utilized for the production of each individual louver of the series. That is, since the louvers of our disclosed panel parts are parallel to the base edge of the triangular blank and extend to the edge which is in right-triangular relationship to the base, the successive portions of the die which are utilized for the formation of each succeeding louver of the series increase in length from the top of the panel part toward the base edge. Preferably, the ends of the individual louvers thus formed are spaced with substantial uniformity from the edge of the blank which comprises the hypotenuse of the right triangle. By utilizing uniform spacing of the louvers and opposite ends of the same die for producing the louvers in the left- and right-hand panel parts of each ventilator section, a continuity of the louver lines is provided for when the ventilator sections are abutted together in pairs. It may be readily understood, of course, that different settings of the guides are required for producing the panel parts of the left- and right-hand portions, as well as for producing the inner and outer panel parts.

As shown in Figs. 26, 27 and 28, sheet metal stock 126 from a roll or strip of preselected width is cut along lines 127 to produce rectangular pieces, such as 128. The pieces 128 are cut diagonally along a line 129 to produce right-triangular blanks such as 130 and 132, from which panel parts 133L, 133R, 134L and 134R may all be produced with a very insignificant amount of material waste. It may be observed by reference to Fig. 28 that uniformity of the width of the stock and blanks for the panel parts 133L, 133R, 134L and 134R is accomplished by providing a marginal portion 135 at the bottom of the parts 133L and 133R which, when bent, provides the flashing and a base mounting flange. In the panel parts 134L and 134R, a marginal portion 136 is provided along the hypotenuse of the right-triangular pieces, which portion, when bent, serves to provide an upper or side mounting flange when the panel parts are assembled into completed ventilator sections and secured together. The formation of the integral louvers in the panel parts 133L, 133R, 134L and 134R is accomplished in a manner similar to that described with respect to the panel parts illustrated in Fig. 23.

Figs. 24, 25 and 29 illustrate a modified method of producing ventilator panel parts of the same general and ultimate types as those heretofore described, this modified method utilizing a different shape of blank and a somewhat different sequence of steps, but retaining the same advantages in respect to the limitation of tool costs for producing ventilators of different sizes and having different pitch angles. As shown in Fig. 24, sheet metal stock 136 of a predetermined width is cut along lines 137 which extend diagonally of the strip or roll stock, so that the resultant pieces 138 are in the shape of a parallelogram. Each parallelogram thus produced has parallel base edges 139 and 140, as well as parallel end edges 142 and 143, each of which end edges forms an acute angle with the adjacent base edge.

By selection of a predetermined length for the parallelogram from one end edge to the other in a direction parallel to the base edge and by utilizing a piercing and forming die having a length which is somewhat less than the aforementioned length of the blank pieces, so as to provide marginal spaces at the ends of the panel parts, the piercing and forming operations for producing the louvers of two panel parts may be accomplished with a single die in sequential steps at each operation of the die. In this instance, guides are utilized with the die which maintain parallel relationship of the successively formed louvers with the base edges of the blank, as well as effecting uniform spacing between the successively formed louvers. Also, uniform spacing is maintained between the ends of the louvers and the end edges of the blanks. As shown in Fig. 25, the inversion of two such blanks and the sequential piercing and forming of the successive louvers in uniformly spaced relationship on both blanks while maintaining corresponding spaced relationship between the ends of the formed louvers and the end edges of the blanks, produces in one blank an outer right-hand panel part 144R and an inner right-hand panel part 145R, while producing in the other or inverted blank an outer left-hand panel part 144L and an inner left-hand panel part 145L.

After the piercing and forming operations which produce the integral louvers for each parallelogram blank, those pieces are severed along lines 146 at the mid portion of each parallelogram blank and in a direction lateral to the base edges of the blank. This severance segregates the partially formed panel parts and effects the production of two substantially right-angular panel parts from each of the parallelograms. In the structures depicted in Fig. 25, a trimming operation is required to remove a small piece of material 141 and a strip of material 147 from each of the outer panel parts 144R and 144L. In this instance, the marginal portions utilized for the formation of the mounting flanges and flashing are incorporated on the inner panel parts 145R and 145L. Panel parts thus produced finally result in the same structural shapes and relationships as those produced by the formerly described method and which are shown in Fig. 23.

In Fig. 29, the production of panel parts for a modified structural form of ventilator section is illustrated. The blanks utilized are of the parallelogram type produced in the manner depicted in Fig. 24 and the piercing and forming operations for the louvers are carried out in a manner similar to that described with respect to the form shown in Fig. 25. However, in this instance, as in the panel parts illustrated in Fig. 28, a marginal portion 148 on each of the left- and right-hand inner panel parts 149L and 149R provides one mounting flange for the ventilator section, while a marginal portion 150 on each of the outer left- and right-hand panel parts 152L and 152R provides material for the flashing and base mounting flange. In this instance, the parallelograms are severed along lines 153 and a narrow strip of material is removed from the base margins of panel parts 149L and 149R. As in the previously described forms, and with particular respect to the form shown in Fig. 28, the panel parts 149L, 149R, 152L and 152R can be secured together in face-to-face relationship to provide left- and right-hand ventilator sections adapted to mounting in coplanar and abutting relationship, as illustrated in the structural drawings, to provide louver type ventilators of relatively large area.

In order further to clarify and explain the piercing and forming operations which have been referred to in connection with our disclosed method, including the modifications of the method, and for the purpose of showing one manner of carrying out the described method steps utilized in the production of panel parts for our sectional louver type ventilators in a manner which tends to minimize the tool costs, we have illustrated in Figs. 30 and 31 a type of die and guide set-up adapted to use in a standard press for carrying out the required operations. As there disclosed, a base 155 is adapted to be mounted on the stationary platform of a standard punch press, and a die supporting block 156 is adapted to be carried for vertical movements by the movable portion of the press. A die support block 157 is mounted in the mid portion of the base 155 and carries a female die block 158 which is secured thereto by fastening means such as screws 159. Extending longitudinally along opposite sides of the die block 158 are material supporting plates 160 and 162, the former of which serves as a shear block. Both of the supporting plates 160 and 162 are secured to the opposite sides of the die supporting block by fastening means such as screws 163. At one side of the die block 158, a platform 164 carries a notched guide plate 165 having a series of parallel and spaced notches 166 in the upper surface thereof, which notches have surfaces facing toward the die block that are adapted to engage an edge of a blank such as 167 to effect the location of the blank relative to the die block so as to locate that blank during the piercing and forming of successive louvers in the blank. On the opposite side of the die block 158 from the platform 164 is a second platform 168 having a surface 169 which engages and supports the side of the blank in which the louvers have been formed.

For effecting location of the blank in a direction longitudinal of the die block, a guide bar 170 is provided, which guide bar is secured to the base 155 through blocks 172a and 173a; the blocks 172a and 173a respectively having series of threaded bores 174a and 175a which receive screws extending through the guide bar 170 to secure that guide bar in place at a preselected angle relative to the longitudinal axis of the die. The threaded bores in the blocks 172a and 173a are so positioned that a number of angular positions of the guide bar 170 can be selected for producing louvers with different pitch angles. As depicted in Fig. 30, the guide bar 170 can be mounted on either side of a lateral center line of the die for performing the piercing and forming operations on either left- or right-hand panel blanks, as well as those which are used as the inner and outer panel parts. Blocks 172b and 173b having series of threaded bores 174b and 175b therein are utilized to carry the guide bar 170 in the second position.

The die supporting block 156 is carried for vertical linear movement relative to the die block 158 by guide rods 176 at its opposite ends. This die supporting block carries a male die 177 in aligned relationship relative to the die block 158 and the supporting plate 160. On opposite sides of the die 177 and extending longitudinally thereof are gripping plates 178 and 179 which are carried for limited movement relative to the supporting block 156 and the opposite side surfaces of the die 177 by a series of alternated guide screws 180 and compression springs 182, which guide screws guide and limit the linear movements of the gripping plates 178 and 179 and which compression springs bias those gripping plates away from the supporting block 156 and toward the material supporting plates 160 and 162. Thus, in operation, the sheet material of the blank being pierced and formed is gripped between the supporting plates 160 and 162 and the gripping plates 178 and 179 on opposite sides of the die 177 before the piercing and forming operation of the die is commenced and while that piercing and forming operation is in progress.

It may be readily understood that with the die and guide structure shown in Figs. 30 and 31, blanks of either the previously discussed triangular or parallelogram type may be located for the successive piercing and forming of louvers therein by placing the blank on the guide plate 165 with one edge engaged by a notch surface in that plate and with the blank laterally located relative to the die by the guide bar 170. The successive louvers are formed in the blank with their positions determined by the use of successive notches in the guide plate 165 while the other edge of the plate is kept in contact with the guide bar 170. In the production of panel parts from triangular blanks, successively varying end portions of the punching and forming dies are utilized, while in the production of panel parts from the parallelogram type of blanks, the entire length of the piercing and forming dies is utilized at each piercing and forming step.

Having thus described our invention, what we claim as new and desired to secure by Letters Patent of the United States is:

A sectional louver type ventilator comprising, in combination, a plurality of sections for mounting in coplanar relationship to one another and having edges corresponding in shape and dimensions and adjoinable in adjacent abutting relationship to provide a ventilator of relatively large area and predetermined polygonal shape, each of said sections embodying an integral panel having a series of elongated openings therein in spaced relationship to one another and louvers projecting from the panel surface adjacent each of the openings, said openings being spaced from one end of the panel and extending to the opposed end thereof, said louvers being normally free of one another at said opposed end, each section also having a separate part connecting and supporting the free ends of the louvers of that section, said part of each section comprising a strip having portions displaced from one another laterally of the part and offset from one another in substantially parallel planes with openings in one of the portions for receiving the free ends of the louvers, said part also including an integral web between said portions to which the free ends of the louvers are secured, means including said separate part on each section for effecting alignment of the ends of the two sections in assembled relationship in relative positions such that the louvers and openings of the sections are substantially aligned with one another, and said ventilator having a trim strip secured to one of the parts and covering externally exposed portions of the parts.

References Cited in the file of this patent

UNITED STATES PATENTS

| | | |
|---|---|---|
| 834,939 | Anderson | Nov. 6, 1906 |
| 1,051,842 | Loehner | Jan. 28, 1913 |
| 1,253,387 | Kane | Jan. 15, 1918 |
| 1,896,656 | Schwartz | Feb. 7, 1933 |
| 2,509,016 | Peterson | May 23, 1950 |
| 2,555,626 | Avers et al. | June 5, 1951 |
| 2,618,331 | Hicks | Nov. 18, 1952 |
| 2,675,072 | Smith | Apr. 13, 1954 |
| 2,741,973 | Swor | Apr. 17, 1956 |